3,265,741
FLUOROALKOXY CONTAINING PHENYL ETHERS
William Arthur Sheppard, Wilmington, Del., assignor to E. I. du Pont de Nemours and Company, Wilmington, Del., a corporation of Delaware
No Drawing. Filed Feb. 1, 1961, Ser. No. 86,301
6 Claims. (Cl. 260—613)

This invention is directed to a new class of fluorine-containing organic compounds and to processes for obtaining them. More particularly, the invention relates to, and has as its principal objects, the provision of a new class of polyfluorinated ethers and to processes for preparing them.

Fluorinated compounds possess unusual and often unexpected physical and chemical properties. The products range from highly reactive compounds which are useful as intermediates in chemical reactions to compounds which are substantially inert to chemical change. Fluorinated compounds, therefore, represent a versatile group of products for which uses are continually being developed in many fields of technology. It is not possible, on the basis of our present knowledge, to predict what properties new classes of fluorinated compounds will show.

In the broad spectrum of known and potential fluorine-containing compounds, fluorinated ethers have received little atention. Ethers in which the ethereal oxygen is bonded to open-chain fluorinated groups have been studied and ethers bearing one fluoroalkyl group and one phenyl group on the ethereal oxygen are known. Compounds of these known classes are rather volatile and their fields of usefulness are limited. They are not suitable, for example, in applications involving very low and very high temperatures where high fluidity and low volatility are needed. This invention is directed to providing fluorinated ethers whose physical properties permit use in applications which require satisfactory performance over a wide range of temperatures.

DEFINITION AND DESCRIPTION OF PRODUCTS

The fluorinated ethers of the invention consist of separate benzene rings joined solely through ether oxygen (—O—), with at least each terminal ring having as a substituent at least one polyfluoroalkoxy group consisting of carbon, fluorine and at most one hydrogen which, if present, is on a carbon at least once removed from the oxy oxygen.

The preferred compounds are presented by the following generic formula:

$$Z_a'ArO(Z_c''ArO)_dArZ_b''' \qquad (1)$$

where Ar is an aromatic carbocyclic group having 6 ring carbons, i.e., a benzene nucleus, having Z groups as its sole substituents; each Z (i.e., each of Z', Z" and Z''') is a group of the general formula X—R$_f$—O, where R$_f$ is a divalent perfluoroalkylene radical of up to 12 carbons which can be straight or branched chain; $a$ and $b$ are cardinal whole numbers of 1–3, i.e., $a$ and $b$ are 1, 2, or 3; $c$ is a cardinal whole number of 0–2, i.e., $c$ is 0, 1, or 2; $d$ is a cardinal whole number of 0–3, i.e., $d$ is 0, 1, 2, or 3; X is hydrogen or fluorine. This group of compounds is preferred solely because of availability of reactants.

The following examples are illustrative of the products of the invention:

3,3'-bis(trifluoromethoxy)diphenyl ether
2,2'-bis(trifluoromethoxy)diphenyl ether
2,3'-bis(ω-hydroperfluoropropyloxy)diphenyl ether
3,3'-bis(ω-hydroperfluorooctyloxy)diphenyl ether
2,2'-bis(ω-hydroperfluorododecyloxy)diphenyl ether
3,3'-bis(trifluoromethoxy)-4,4'-bis(3"-trifluoromethoxyphenoxy)diphenyl ether
1,3-bis(3'-perfluorohexyloxyphenoxy)benzene
3,3',5,5'-tetrakis(trifluoromethoxy)diphenyl ether
1,4-bis(trifluoromethoxy)-2,6-bis(3'-trifluoromethoxyphenoxy)benzene
4,4'-bis(2H-perfluoroisobutyloxy)diphenyl ether
3,3'-bis(2H-perfluoropropyloxy)-4,4'-bis(3"-2H-perfluorododecyloxyphenoxy)diphenyl ether
1,4-bis(2H-perfluorododecyloxy)-2,6-(3'-2H-perfluorododecyloxyphenoxy)benzene
3,3',5,5'-tetrakis(2H-perfluorobutyloxy)diphenyl ether
1,4-bis(perfluoroethoxy)-2,6-bis(3'perfluorobutoxyphenoxy)benzene
4,4'-bis[4"-(ω-hydroperfluoroamyloxy)phenoxy]diphenyl ether
4-(4"-perfluoroethoxyphenoxy)-4'-(4"-trifluoromethoxyphenoxy)diphenyl ether
4-[3"-(ω-hydroperfluoroethoxy)phenoxy]-4'-(4"-perfluoroethoxyphenoxy)diphenyl ether
2,4'-bis(nonafluorobutoxy)diphenyl ether
2,2',4-tris(trifluoromethoxy)diphenyl ether
3,3',4,4',5,5'-hexa(trifluoromethoxy)diphenyl ether The new compounds are colorless liquids which are fluid even at relatively low temperatures. They are substantially non-volatile at prevailing atmospheric temperatures and they are not readily lost by evaporation. The compounds have high boiling points and they possess excellent stability at high temperatures. As a class, the compounds are resistant to thermal decomposition and to oxidative breakdown. As with most organic compounds, the viscosity of the new products decreases with rise in temperature, but the products retain their viscosity to a sufficient degree to be usable at high temperatures. They can be stored for prolonged periods in containers made of conventional materials, e.g., glass, commercially-available plastics, metals, and the like. The compounds are insoluble in water and they are not affected by prolonged contact with water or water vapor. The compounds are soluble in a number of organic liquids, e.g., benzene, halogenated hydrocarbons (carbon tetrachloride, chloroform) and in dialkyl formamides (dimethylformamide).

Because of their excellent stability and high fluidity over a wide temperature range, the compounds are useful as heat transfer liquids for controlling temperatures of chemical reactions, as stable lubricants which are required to function over a wide range of temperatures, as damping fluids in large scale weighing machines, and as hydraulic fluids for transmission of energy (automatic transmissions, braking mechanisms and the like).

METHODS OF PREPARATION

The compounds of the invention are obtained by four general procedures, which employ phenols as a common class of reactants, i.e., compounds which bear at least one hydroxyl group bonded to a carbon of a benzene nucleus. As will be apparent to the skilled organic chemist, a combination of these processes can be used to obtain a multitude of desired products.

*Procedure A.*—This procedure employs as reactants (1) phenols having one or more polyfluorinated alkoxy substituents of up to 12 carbons, which consist of carbon, fluorine, and at most one hydrogen, (2) polyhalogenated benzenes in which the halogens are of atomic number of at least 17, and (3) a strong base. Preferably a copper salt catalyst is employed to increase the rate at which the reaction proceeds. The preferred phenols are monohydric, i.e., they have one —OH group, and consist of one or more benzene rings in which the linkage between rings is through ether oxygen, which rings have from 1–3 substituents of the general formula XR$_f$O—, where X and R$_f$ have the meanings given earlier. Most preferred are the thus described phenols containing at most 4 benzene rings. Preferred polyhalogenated benzenes for use as the second reactant are benzenes bearing 2-3 halogens which are bromine or iodine. For reasons of availability, polybromobenzenes are especially preferred. Strong bases which are used as the third reactant are preferably alkali metal hydroxides and alkaline earth metal hydroxides, e.g., sodium hydroxide, potassium hydroxide, calcium hydroxide, barium hydroxide, and the like. For reasons of availability and solubility in reaction media, the alkali metal hydroxides are especially preferred.

The first step in the process consists in forming the metal salt of the phenol.

Examples of phenols which are operable in the process are p-trifluoromethoxyphenol, m-pentafluoroethoxyphenol, m-(2H-tetrafluoroethoxy)phenol, 2,4-bis(trifluoromethoxy)phenol, and the like.

The above process is conveniently performed in the presence of an inert liquid medium, e.g., a hydrocarbon such as benzene, toluene, xylene, cyclohexane, methylcyclohexane, isooctane, decane, and the like. The polyfluorohydrocarbyloxy-substituted phenol, the basic reactant and the inert liquid are charged into the reaction vessel and the mixture is refluxed until a salt is formed from the phenol and the base. The extent of salt formation can be followed, if desired, by isolating and measuring the water formed as a by-product.

The second step consists in reacting the salt formed as described above with a polyhalobenzene. The polyhalobenzene is charged into the reaction vessel with a copper salt catalyst, preferably, a cupric salt of an inorganic acid, e.g., cupric carbonate, and the reaction mixture is again heated to refluxing temperature. The inert liquid is gradually removed during this period by distillation and condensation to permit a gradual rise in temperature. A final temperature in the range of 200–240° C. is usually employed. The time of refluxing can range from 1 hour to 48 hours or more, but normally 5 hours to about 24 hours is sufficient to complete the reaction at the above temperatures. The mixture is cooled and extracted with a solvent for polyfluoroalkoxy ethers. The extracts are then worked up by conventional and well-known procedures, employing evaporation, distillation, etc. The extracting liquids which can be employed include ethers (e.g., diethyl ether, di-n-butyl ether, 1,2-dimethoxyethane and similar compounds) and halogenated compounds (e.g., chloroform, tetrachloroethane, methylene dichloride and carbon tetrachloride). The extraction step and the liquid employed for extraction of the desired products are not critical features of the invention. The extraction step is, in fact, employed only as a convenient means of isolating the desired product.

The mole ratio in which the reactants are used is not critical. For example, the ratio, moles polyhalobenzene/moles phenol, can lie between about 0.1 and 1.0. A preferred ratio, which will provide good yields of desired product, lies between about .1 and .5.

The above described process can be conducted in conventional vessels at atmospheric pressure. The reaction vessels can be made of glass, corrosion-resistant metals, and the like. It is preferable that anhydrous conditions be maintained.

*Procedure B.*—This procedure can be used to prepare compounds of the invention which bear one or more trifluoromethoxy groups, i.e., compounds in which at least one of the Z groups of Formula 1 is CF$_3$O. The process is most conveniently employed in the event it is desired to obtain compounds having at least two trifluoromethoxy groups.

The reactants employed are (1) carbonyl fluoride (COF$_2$), (2) sulfur tetrafluoride (SF$_4$), and (3) a phenol consisting of a plurality of separate benzene rings joined through ether oxygen, i.e., —O—, which rings have as substituents at least one hydroxyl group bonded to nuclear carbon of one ring and at least one member of the class consisting of hydroxyl and polyfluoroalkoxy groups of the general formula XR$_f$O, as defined above, bonded to nuclear carbon of a second ring. Preferred phenols for use in this process are polyhydric phenols which consist of benzene rings which are joined through ether oxygen and in which at least two of the rings each bear at least one hydroxyl group bonded to nuclear carbon. Most preferred are the thus described phenols containing at most 4 benzene rings.

Examples of operable phenols are 4-trifluoromethoxy-4'-hydroxy-diphenyl ether, 4-(2H-tetrafluoroethoxy)-4'-hydroxydiphenyl ether, 4,4'-dihydroxydiphenyl ether, 2,4'-dihydroxydiphenyl ether, 1,4-bis(3'-hydroxyphenoxy)benzene, and 4,4'-bis(4''-hydroxyphenoxy)diphenyl ether. Monoperfluoroalkoxy derivatives of the above dihydroxy phenols may be used in procedure A.

The process is conducted in two steps which can, if desired, be performed in the same reaction chamber. Substantially anhydrous conditions are maintained throughout both steps in view of the sensitivity of carbonyl fluoride and sulfur tetrafluoride to water.

Either a batch or a continuous flow process can be used and the process is preferably conducted in a corrosion-resistant vessel. In a batch process, the vessel is charged with the phenol and carbonyl difluoride. Optionally, an inert liquid can be charged into the vessel to facilitate solution of the reactants. The vessel is closed and it is heated under autogenous pressure to the desired temperature. The temperature is kept as low as operability permits, but it will generally lie between about 75° and 300° C. A preferred temperature range lies between 100° and 200° C. The time of reaction will generally lie between 0.5 and 24 hours. Normally, a time of 1 to 10 hours is sufficient. The temperature, time and pressure are not critical features of the process. The pressure, as a matter of convenience, is autogenous but the amount of pressure need be no more than required to prevent escape of the volatile carbonyl difluoride.

Following the above steps in the process, the vessel is cooled and it is vented to release volatile products. The vessel is then charged with sulfur tetrafluoride and the mixture is heated again under autogenous pressure. In this step, temperatures are employed which range from about 75° to 350° C.; preferably, the temperature lies between 100° and 250° C. As in the first step of this process, the temperature and pressure are not critical. The pressure need be no greater than necessary to maintain the sulfur tetrafluoride in the reaction chamber.

The time for the heating step in the process lies between about 1 hour and about 24 hours. Normally, a period of 2 to 10 hours suffices to obtain satisfactory yields. The time of the reaction is not critical and even short periods of heating, as low as 15 minutes, will provide a measurable quantity of desired product.

The inert liquid which is optionally used in the reaction should be stable under the conditions of temperature and pressure. Examples of operable liquids which can be employed are benzene, toluene, nitrobenzene, perfluorinated hydrocarbons, and the like. Nitrobenzene is a readily available low cost liquid and it is, therefore, a preferred liquid.

In the process just described, the reaction of carbonyl difluoride with the phenolic compound yields a fluoroformate, i.e., a compound bearing one or more

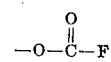

groups. The fluoroformate can, if desired, be separated, but it is not essential to do so. Ordinarily, the fluoroformate is reacted without isolation in the second step with sulfur tetrafluoride to form a compound bearing one or more —OCF$_3$ groups.

The mole ratio of reactants which are employed in this process is not critical. It is preferable, but not essential, to use sufficient carbonyl difluoride to react with all of the —OH groups and sufficient sulfur tetrafluoride to react with all of the fluoroformyloxy groups formed in the first step. For example, the ratios, moles $COF_2$/moles phenolic compound and moles $SF_4$/moles phenolic compound, can lie bebetween about 0.2 and 10; the preferred ratios lie between about 0.5 and 5.0.

The reactants employed in the process are compounds which are available commercially or which can be obtained by methods described in the literature. The preparation of carbonyl difluoride is described, for example, by Emeleus and Wood, J. Chem. Soc., 1948, 2183; the preparation of sulfur tetrafluoride is described by Tullock, Fawcett, Smith and Coffman, J. Am. Chem. Soc., 82, 539–42 (1960).

*Procedure C.*—This process is generally employed to prepare compounds of Formula 1 in which one or more of the Z groups bears a hydrogen, i.e., compounds in which X in the group X—$R_f$—O (which represents Z) is hydrogen. The reactants employed in the process are (1) a phenol as defined for procedure B above, (2) a perfluoroolefin, and (3) a basic catalyst.

The phenols which are operable in procedure B are operable in procedure C and the illustrations of operable phenols for procedure B also apply here.

Fluoroolefins which are preferred for use in this process are olefins in which the double bond is terminal, i.e., α-olefins. The preferred fluoroolefins are represented by the formula

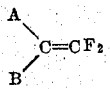

where A and B can be alike or different and are fluorine or saturated perfluorocarbon groups of at most 10 carbons. The preferred fluoroolefins have, therefore, 2 to 12 carbons and they can be straight or branched-chain. Illustrations of operable fluoroolefins are tetrafluoroethylene, hexafluoropropylene, perfluoroisobutylene, perfluorohexene, perfluorooctene and perfluorododecene.

The basic catalyst employed in the reaction is preferably an alkali metal or alkali metal hydride. Sodium metal or sodium hydride are particularly preferred in view of their availability. The basic catalysts are most conveniently employed as dispersions in an inert liquid medium, e.g., kerosene or a light mineral oil.

The process is generally conducted in an inert liquid medium to provide close contact between the reactants. Classes of compounds which are preferred for use as reaction media are ethers and N,N-disubstituted amides which are liquids at the temperature of the reaction. Examples of operable liquids are 1,2-dimethoxyethane, β,β'-dimethoxydiethyl ether, N,N-dimethylformamide, N,N-diethylformamide, N,N-dimethylacetamide, N,N-diethylacetamide, and the like.

The process is conducted in conventional corrosion-resistant vessels as described in the previous procedures. When volatile fluoroolefins are employed as reactants, it is preferable to use vessels which can withstand mild pressures, i.e., pressures up to about 5 to 6 atmospheres. The vessel is charged with the liquid medium and the phenol. The alkali metal or alkali metal hydride is then added gradually and with good stirring. Reaction proceeds rapidly with evolution of a gas (hydrogen). Good control of the rate of reaction is obtained by employing commercially available mineral oil dispersions of alkali metals or alkali metal hydrides. Stirring of the mixture is continued until substantially all of the metal-containing component is in solution. The reaction vessel is connected to a supply of fluoroolefins which is added with agitation and, if necessary, with mild heating of the mixture. Volatile or gaseous fluoroolefins, e.g., tetrafluoroethylene, are normally added under pressure to the reaction mixture to insure good contact between the components. A pressure of up to 75 lbs./sq. in. or higher can be used although generally a pressure of 10–50 lbs./sq. in. is sufficient. The reaction frequently proceeds spontaneously and it is often somewhat exothermic. Under these conditions heating is unnecessary and cooling may, in fact, be desirable. The temperature of the reaction generally lies between about 25° and 100° C. with a preferred range of temperature lying between 35° and 75° C. Close control of the temperature or of the pressure is not necessary and these factors are not critical in the operation of the process. For maximum yield of the product, the fluoroolefin is supplied to the reaction mixture until absorption of the olefin ceases. It is not essential, however, for operability to carry the reaction to this point. The reaction proceeds rapidly and the time for operation can be as short as a few minutes, for example 10 minutes, to as long as 24 hours or more. Time is not a critical feature and need not be controlled accurately.

The mole ratios in which the reactants are used is also not critical for operability. Preferably the ratio, moles of phenol/moles of metal or metal hydride, lies between 1 and 10. For maximum yield of product sufficient fluoroolefin is used to react with the available hydroxyl groups in the phenol.

The reaction mixture is processed in the manner described in procedures A and B and the products are isolated by conventional methods, employing distillation, chromatography, and the like.

*Procedure D.*—In this process a polyhydric polyphenylene ether is reacted with a polyfluoroacid anhydride of the general formula

where the group $XR_f$ has the meaning given in the description above. The thus obtained esters of the polyhydric polyphenylene ethers are reacted with sulfur tetrafluoride by the process described in U.S. 2,859,249 to obtain the compounds of the invention. To illustrate, 4,4'-dihydroxydiphenyl ether is reacted with trifluoroacetic anhydride to obtain 4,4'-bis(trifluoroacetoxy)diphenyl ether which is then reacted with sulfur tetrafluoride to obtain 4,4'-bis(pentafluoroethoxy)diphenyl ether. This procedure can be used to prepare a wide range of the compounds of the invention by employing the appropriate polyfluoroacid anhydrides and polyhydric polyphenylene ethers.

The following examples illustrate the processes of the invention. Also, Examples I–III illustrate representative methods which can be used to prepare those phenolic reactants not readily available.

Example I (A) A glass reaction vessel is charged with a mixture of 43 ml. of concentrated sulfuric acid, 59 ml. of water, and 105 g. of ice. To this mixture 35.4 g. of m-trifluoromethoxyaniline [see L. M. Yogupol'skii Diklady Akad. Nauk S.S.S.R., 105, 100–2 (1955)] is added with stirring. The reaction mixture is cooled to 0–5° C. and a solution of 13.9 g. of sodium nitrite in 30 ml. of water is added slowly with stirring to form the diazonium salt. The cold diazonium salt solution is added portion-wise to a boiling solution consisting of 133 ml. of sulfuric acid and 99 ml. of water. After addition is completed, the solution is extracted with ethyl ether and the extract is filtered and the filtrate is warmed to remove the volatile solvent. The liquid residue is distilled under reduced pressure through an efficient fractionating column to yield 16.1 g. of m-trifluoromethoxyphenol, boiling at 69.5–79.5° C./24 mm.

(B) A glass reaction vessel, equipped with a Dean-Stark unit for continuous separation of water from an organic solvent carrier, is charged with 10.21 g. of m-trifluoromethoxyphenol, 30 ml. of toluene and 3.8 g. of potassium hydroxide. The mixture is heated to reflux for 2–3 hours until all the water which forms in the process is separated in the collection unit. The solution is then distilled to remove about 15 ml. of toluene. m-Dibromobenzene (6.76 g.) and cupric carbonate (0.5 g.) are added to the reaction mixture which is heated gently to a temperature of 200° C. The remaining toluene is removed by distillation and the residual mixture is heated under reflux at 220–240° C. overnight (about 18 hours). The mixture is cooled and forms a pasty dark solid. The solid is extracted several times with ethyl ether and the extracts are evaporated to remove the low-boiling solvent. The oil which remains is distilled at reduced pressure to obtain 7.59 g. of bis(trifluoromethoxy)triphenylene ether, boiling at 138–143° C./0.59 mm., $n_D^{25}$, 1.5048. The compound is also called 1,3-bis(3'-trifluoromethoxyphenoxy)benzene.

The compound is a mobile liquid at temperatures as low as −40° C. and it is a glass-like solid at −80° C. It boils at 336° C. in an open tube. It can, if desired, be purified further by distillation under reduced pressure from anhydrous sodium carbonate. The compound has the following structural formula:

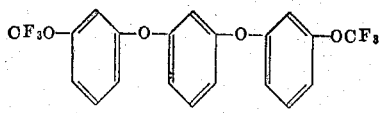

Characterizing values for its ultraviolet absorption spectrum are: $\lambda_{max.}$, 271, 277; $\epsilon$, 3740, 3580; for nuclear magnetic resonance spectrum, frequently displacement, −371 c.p.s. at 40 mc./sec. (reference, $CFCl_2CFCl_2$ at 0 c.p.s.).

Analysis.—Calc'd for $C_{20}H_{12}F_6O_4$: C, 55.8; H, 2.81; F, 26.5. Found: C, 56.2; H, 2.93; F, 26.7.

*Example II*

(A) A glass reaction vessel is charged with 10.6 g. of potassium hydroxide (pellets) and 24.8 g. m-methoxyphenol. The mixture is heated with stirring until a solution is obtained and 30 ml. of n-decane is added to the solution. The vessel is equipped with a Dean-Stark apparatus and the reaction mixture is heated with agitation to boiling. Heating and refluxing is continued until 3.9 ml. of water is collected in the Dean-Stark receiver. The Dean-Stark unit is replaced with a reflux condenser bearing an addition funnel and 0.5 g. of cupric carbonate is added to the mixture. The reaction mixture is heated to reflux temperature (about 173° C.) and 42.5 g. of p-bromophenyl trifluoromethyl ether is added dropwise through the addition funnel. Refluxing and stirring of the reaction mixture is continued for 5 hours. The mixture is cooled to form a pasty solid which is extracted repeatedly with ethyl ether. The solid which remains is sodium bromide (19.6 g.). The ether extract is washed three times with 35 ml. portions of sodium hydroxide solution (2.5 N) and the extract is dried over an anhydrous magnesium sulfate. The dried solution is filtered and the filtrate is distilled through an efficient fractionating column to obtain 32.1 g. of p-tri-fluoromethoxy-m'-methoxydiphenyl ether, B.P. 126° C./1.5 mm., $n_D^{26}$, 1.5072. The identity of the compound which has the structure $$CF_3OC_6H_4OC_6H_4OCH_3$$

is confirmed by its infrared, ultraviolet and nuclear magnetic resonance spectra:

Analysis.—Calc'd for $C_{14}H_{11}F_3O_3$: F, 20.1. Found: F, 20.4.

(B) A glass reaction vessel, equipped with a reflux condenser, is charged with 4.2 g. of potassium hydroxide (pellets) and 10 ml. of diethylene glycol. The mixture is heated to 200° C. and 2–3 ml. of the glycol is permitted to distill from the vessel to remove a small amount of water. The reaction mass is maintained at 200–205° C., i.e., at refluxing temperature, and 14.2 g. of the p-trifluoromethoxy-m'-methoxydiphenyl ether is added dropwise. Heating at 200° C. is continued for 6 hours. The reaction mixture is cooled and is diluted with 50 ml. of water. The aqueous mixture is extracted three times with 50 ml. portions of pentane, to remove unreacted starting material of which 6.8 g. is recovered. The residual aqueous solution is acidified with 9.5 ml. of concentrated hydrochloric acid and it is then extracted with three 15 ml. portions of toluene. The combined toluene extracts are dried over anhydrous magnesium sulfate and filtered. The filtrate is distilled through an efficient fractionating column to yield 3.32 g. of p-trifluoromethoxy-m'-hydroxdiphenyl ether, B.P. 124° C./0.85 mm.; $n_D^{25}$, 1.5191–1.5207. The identity of the compound which has the structure $$CF_3OC_6H_4OC_6H_4OH$$

is confirmed by its infrared, ultraviolet and nuclear magnetic resonance spectra and by elemental analysis.

Analysis.—Calc'd for $C_{13}H_9F_3O_3$: C, 57.8; H, 3.36; F, 21.1. Found: C, 58.1; H, 3.34; F, 20.4.

The above process of Part B is repeated employing 6.8 g. of potassium hydroxide, 16 ml. of diethylene glycol and 23.0 g. of p-trifluoromethoxy-m'-methoxydiphenyl ether. The mixture is refluxed for 24 hours at 200–210° C. A total of 7.96 g. of starting material is recovered and 7.88 g. of p-trifluoromethoxy-m'-hydroxydiphenyl ether is obtained.

(C) A glass reaction vessel, equipped with a Dean-Stark unit, is charged with 9.5 g. of p-trifluoromethoxy-m'-hydroxydiphenyl ether (obtained in Part B), 1.96 g. of potassium hydroxide (pellets) and 15 ml. of decane. The mixture is heated to boiling and sufficient decane is distilled to remove any water which is formed or is present. Cupric carbonate (0.5 g.) is added to the mixture and the Dean-Stark unit is replaced with a reflux condenser fitted with an addition funnel. The reaction mixture is heated with stirring to refluxing and 4.0 g. of m-dibromobenzene is added dropwise while the mixture is refluxing. Heating at the reflux temperature is maintained for 5 hours following which the mixture is cooled. It is extracted repeatedly with ethyl ether and the combined ether extracts are distilled through an efficient fractionating column. There is obtained 6.71 g. of bis(trifluoromethoxy)pentaphenylene ether as a substantially colorless oil, B.P. 241° C./0.5 mm.; $n_D^{25}$, 1.5540. The compound has the following structural formula:

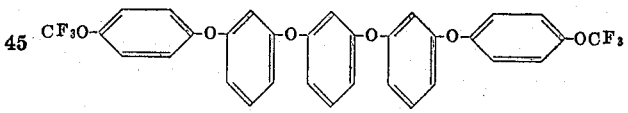

It is also called 1,3-bis[3'-(4''-trifluoromethoxyphenoxy)phenoxy]benzene. The identity of the compound is confirmed by its infrared and ultraviolet absorption spectra and by elemental analysis.

Analysis.—Calc'd for $C_{30}H_{20}F_6O_6$: C, 62.6; H, 3.28; F, 18.6. Found: C, 62.9; H, 3.09; F, 18.4.

*Example III*

(A) A glass reaction vessel is employed which is equipped with a reflux condenser, a thermometer, a magnetically-driven stirrer and an addition funnel. The flask is charged with 104.3 g. of m-nitrophenol and this liquid is heated to 120° C. with stirring. Approximately 200 g. of trifluoroacetic anhydride is added dropwise with agitation, and after addition is complete, the reaction mixture is heated at refluxing temperature until the solid which forms is completely dissolved. The reflux temperature at this point is about 70° C. The reaction mixture is distilled through an efficient fractionating column to obtain 154.8 g. of m-nitrophenyl trifluoroacetate; B.P., 92° C./1.15 mm.; M.P., 41.44–6° C.

Analysis.—Calc'd for $C_8H_4F_3O_4N$: F, 24.3; N, 6.0. Found: F, 23.7; N, 6.3.

(B) A pressure vessel (capacity, 1 liter) which is made of a corrosion-resistant steel, is charged with 155 g. of m-nitrophenyl trifluoroacetate, prepared as described in Part A. The vessel is flushed with nitrogen and it is cooled to a low temperature in a solid carbon dioxide bath. Pressure in the vessel is reduced to a low value to remove traces of moisture and it is charged with 25 g. of anhydrous hydrogen fluoride and 155 g. of sulfur tetrafluoride. The vessel is closed and the reaction mixture is heated under autogenous pressure at 60° C. for 2 hours, 140° C. for 2 hours, and 160° C. for 2 hours. The vessel is cooled and volatile products are removed by venting. The liquid residue (193 g.) is transferred to a corrosion-resistant container, employing methylene chloride to aid in the transfer. The mixture is agitated with sodium fluoride to remove residual hydrogen fluoride and filtered. The filtrate is distilled through an efficient fractionating column to yield 141.6 g. of m-nitrophenyl pentafluoroethyl ether; B.P. 66° C./2.3 mm.; $n_D^{25}$, 1.4293.

Analysis.—Calc'd for $C_8H_4F_5NO_3$: F, 37.0; N, 5.45. Found: F, 36.7; N, 5.58.

(C) A pressure vessel is charged with an ethanol solution of 130 g. of m-nitrophenyl pentafluoroethyl ether, obtained as described in Part B, and 1 g. of 5% palladium-on-charcoal catalyst. The vessel is connected to a source of hydrogen and the reaction mixture is hydrogenated in a conventional manner. The catalyst is removed from the reaction mixture by filtration and the filtrate is distilled through a fractionating column to obtain 91.5 g. of m-aminophenyl pentafluoroethyl ether; B.P. 95° C./22 mm.; $n_D^{25}$, 1.4300.

Analysis.—Calc'd for $C_8H_6F_5NO$: C, 42.3; H, 2.66; F, 41.8; N, 6.17. Found: C, 42.6; H, 2.86; F, 41.9; N, 6.93.

(D) Diazotization of m-aminophenyl pentafluoroethyl ether, prepared as described in Part C, is conducted according to the procedure given in Organic Syntheses, coll. vol. 1, p. 404, employing the following quantities of reactants: 45.5 g. of m-aminophenyl pentafluoroethyl ether, 43 ml. of concentrated sulfuric acid, 59 ml. of water and 105 g. of ice. The mixture is reacted with 13.9 g. of sodium nitrate dissolved in 20 ml. of water. The solution of diazonium compound is hydrolyzed by gradual addition to a refluxing solution of 133 ml. of concentrated sulfuric acid in 99 ml. of water. The solution is extracted with pentane and the pentane extract is dried over anhydrous magnesium sulfate, filtered and distilled as described earlier. There is obtained 20.1 g. of m-hydroxyphenyl pentafluoroethyl ether, B.P. 84° C./44 mm.; $n_D^{25}$, 1.4125.

Analysis.—Calc'd for $C_8H_5F_5O_2$: C, 42.1; H, 2.21; F, 41.7. Found: C, 42.8; H, 2.43; F, 41.1.

(E) A glass reaction vessel, equipped with a reflux condenser as described in Example II-A, is charged with 13.1 g. of m-hydroxyphenyl pentafluoroethyl ether, 3.2 g. of potassium hydroxide, and 10 ml. of decane. The mixture is refluxed until removal of water is complete as shown by the volume of water collected in the Dean-Stark unit. Cupric carbonate (0.5 g.) is added to the mixture and the reaction mixture is heated to refluxing temperature under an atmosphere of dry nitrogen. m-Dibromobenzene (6.76 g.) is added dropwise to the boiling mixture and refluxing is continued for 5 hours. An oil bath at 200–220° C. is employed as a means of maintaining a satisfactory refluxing temperature. The mixture is cooled and the pasty mass which forms is extracted with ether and pentane. The ether and pentane extracts are combined and the resulting mixture is washed with 5% sodium hydroxide solution and with water. It is dried over anhydrous magnesium sulfate, filtered and the filtrate is distilled through an efficient fractionating column. There is obtained 8.6 g. of 1,3-bis(3'-pentafluoroethoxyphenoxy)benzene; B.P. 127–129° C./0.25 mm.; $n_D^{24.5}$, 1.4702. At atmospheric pressure the compound boils at 339° C. On cooling it remains a mobile liquid to about −25° C. At −30° C. it becomes a glass-like solid.

The identity of the compound which has the formula $CF_3CF_2OC_6H_4O-C_6H_4-OC_6H_4OCF_2CF_3$, is confirmed by elemental analysis.

Analysis.—Calc'd for $C_{22}H_{12}F_{10}O_4$: C, 49.8; H, 2.28; F, 35.8. Found: C, 50.2; H, 2.56; F, 34.4.

The process of Examples I–III is generically applicable to the preparation of polyphenyl ethers bearing polyfluoroalkoxy substituents on nuclear carbons. Phenols of the formulas $XR_fOC_6H_4OH$, $XR_fOC_6H_4OC_6H_4OH$, $(XR_fO)_2C_6H_3OH$ and the like, wherein $XR_fO$ has the definition given above can be reacted with polybromo- or polyiodobenzenes to obtain the compounds of Formula 1. Specific illustrations of the group $XR_fO$ in operable phenols are $CF_3O-$, $C_2F_5O-$, $HC_2F_4O-$, $C_3F_7O-$, $HC_3F_6O-$, and the like.

Example IV

A pressure vessel (capacity, 240 ml.) of corrosion-resistant material is flushed with nitrogen and charged with 35 g. of nitrobenzene and 35 g. of 4,4'-dihydroxydiphenyl ether. The reaction vessel is cooled in a solid carbon dioxide-acetone bath and evacuated to a low pressure, (about 0.1 mm. Hg). The vessel is then charged with 30 g. of carbonyl difluoride and the reaction mixture is heated under autogenous pressure at 150° C. for 1 hour and 175° C. for 2 hours. The vessel is cooled and vented to remove volatile products.

The vessel is now charged with 40 g. of sulfur tetrafluoride. The reaction mixture is heated at 100° C. for 2 hours, 150° C. for 2 hours and 175° C. for 2 hours under autogenous pressure. The vessel is cooled to atmospheric temperature and vented to remove volatile products.

The liquid residue in the reaction vessel is dissolved in ether, the ether solution is washed with water several times and the washed ethereal solution is dried over anhydrous magnesium sulfate. The solution is filtered and the filtrate is evaporated to remove the low boiling solvent. The liquid residue is distilled under reduced pressure through an efficient fractionating column to yield 3.1 g. of 4,4'-bis(trifluoromethoxy)diphenyl ether, boiling at 111.5° C./3.3 mm.; $n_D^{25}$, 1.4643. The compound boils without decomposition at 252° C. in an open tube. It does not support combustion. On cooling it remains as a very mobile liquid until about −35° C. at which temperature it crystallizes.

The compound has the following structural formula:

The ultraviolet absorption spectrum shows the following characteristics: $\lambda_{max}$, 230, 275, 280; $\epsilon$, 2390, 2440, 10,000.

Analysis.—Calc'd for $C_{14}H_8F_6O_3$: C, 49.7; H, 2.39; F, 33.7. Found: C, 50.9; H, 2.75; F, 33.2.

The process of Example IV is generically applicable to the preparation of polyphenyl ethers bearing trifluoromethoxy groups on nuclear carbons. To illustrate, the process of Example IV can be used to react dihydroxyphenoxyphenols, bis(dihydroxyphenyl)ethers, trihydroxyphenoxyphenols, and the like with $COF_2$ and $SF_4$ to form the corresponding trifluoromethoxy compounds. Compounds of the formulas $XR_fOC_6H_4OC_6H_4OH$, $(XR_fO)_2C_6H_3OC_6H_4OH$ and the like are operable as reactants with $COF_2$ and $SF_4$ to obtain products of the invention having both $XR_fO$ groups and $OCF_3$, where $XR_fO$ is defined as above and is illustrated by groups such as $HC_2F_4O-$, $C_3F_7O-$, $C_4F_9O-$, $HC_4F_8O-$, and the like.

Example V

A glass reaction vessel fitted with a stirrer, is charged with 100 ml. of 1,2-dimethoxyethane (glyme) and 20.2 g. of 4,4'-dihydroxydiphenyl ether. The mixture is stirred and 0.5 g. of a suspension of sodium hydride (54%) in mineral oil is added gradually in small portions. Reaction occurs immediately with evolution of hydrogen gas. The mixture is stirred gently for 1 hour at 50° C. until the reaction is complete, i.e., hydrogen is no longer evolved. The solution is cooled and transferred to a pressure bottle of 400 ml. capacity. The bottle is enclosed in a protective metal screen and it is connected to a supply of tertafluoroethylene at 40 lbs. pressure. Tetrafluoroethylene is pressured into the bottle and the mixture is agitated and heated to 60° C. No reaction is evident and the pressure vessel is removed from the supply of tetrafluoroethylene. A further quantity (1.0 g.) of the sodium hydride-mineral oil suspension is added gradually to the reaction mixture. The pressure bottle is again repressured to 40 lb./sq. in. with tetrafluoroethylene, employing a protective shield between the operator and the unit. The mixture is heated to 60° C. with agitation and an exothermic reaction sets in. Tetrafluoroethylene is supplied to the vessel to maintain the pressure at 40 lb./sq. in. until the reaction is complete. A total of about 25 g. of tetrafluoroethylene is absorbed.

The solution is poured into about 2 liters of a mixture of ice and water and the oily layer which forms is separated. This layer is extracted three times with 100 ml. portions of pentane. The combined pentane extracts are dried over magnesium sulfate and filtered. The filtrate is distilled through an efficient fractionating column to yield 37.5 g. of 4,4'-bis(2H-tetrafluoroethoxy)-diphenyl ether, B.P., 117° C./0.3 mm.; $n_D^{25}$, 1.4450. The identity of the compound, which has the formula $$HCF_2CF_2O\text{—}C_6H_4\text{—}O\text{—}C_6H_4\text{—}OCF_2CF_2H$$

is confirmed by its nuclear magnetic resonance spectrum and by elemental analysis.

*Analysis.*—Calc'd for $C_{16}H_{10}F_8O_3$: C, 47.8; H, 2.51; F, 37.8. Found: C, 48.1; H, 2.50; F, 37.8.

The process in Example V is generic to the preparation of the compounds of the invention by reacting a phenol with a fluoroolefin. To illustrate, phenols of the formula $HOC_6H_4O\text{—}(C_6H_4O)_n\text{—}C_6H_4OH$, where $n$ is a cardinal number of up to 4, i.e., 0 to 4, inclusive, can be reacted with fluoroolefins such as hexafluoropropene, perfluorobutene, perfluoroisobutene, perfluorododecene, and the like to obtain compounds in which the OH groups of the phenol reactants are converted to $XR_fO$ groups. To illustrate, $HOC_6H_4OC_6H_4OC_6H_4OH$ can be reacted with tertafluoroethylene to yield $$HC_2F_4OC_6H_4OC_6H_4OC_6H_4OC_2F_4H$$

Monohydric phenols, e.g., $(XR_fO)_2C_6H_3OC_6H_4OH$, can be reacted with perfluoroolefins of the type illustrated above to provide compounds of the invention having mixed polyfluoro alkoxy groups, e.g., $$C_2F_5OC_6H_4OC_6H_4OC_3F_7H$$

As stated earlier, the new compounds of the invention have excellent thermal stability. To illustrate, three glass tubes containing, respectively, pieces of ordinary carbon steel, copper metal, and aluminum metal are each charged with portions of the compound of Example I. A fourth tube, containing no metal, is also charged with a portion of this compound. The tubes are sealed and they are heated to 200° C. for up to 50 hours. There is no evidence of decomposition of the compound or of attack on any of the metals during this period.

The compounds of the invention can also be heated to boiling at atmospheric pressure in an open tube without evidence of decomposition, as illustrated in Example IV. The compounds will not support combustion and they retain a high degree of fluidity even at low temperatures. In view of their non-corrosive nature, high boiling point, thermal stability, and excellent fluidity even at low temperatures, the compounds are generically useful as fluids for transmission of power by hydraulic machinery, that is, as hydraulic fluids. For instance, they are useful as the fluid in hydraulic presses, hydraulic fork-lift trucks and as components in hydraulic brake fluids.

The compounds are useful as solvents for low molecular weight poly(tetrafluoroethylene) resins. These solutions are used to impregnate cellulose to form a water-repellent product. To illustrate, a solution is prepared by warming a low molecular weight poly(tetrafluoroethylene) resin (melting range 83–145° C.) and 4,4'-bis(trifluoromethoxy)diphenyl ether in the ratio of about 1 part of the resin to 40 parts of the ether. A strip of pure cellulose sheet is immersed in the solution for a few minutes, the strip is withdrawn and rinsed in acetone to remove the solvent. A drop of water which is placed on the dried treated strip is not absorbed whereas a drop of water which is placed on an untreated control strip is absorbed immediately. The treated strip does not support combustion, a behavior which is in sharp contrast to the ease with which an untreated strip burns.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula, $$Z_a'ArO(Z_c''ArO)_dArZ_b'''$$

wherein Ar is a benzene nucleus; each Z is a radical of the formula $X\text{—}R_f\text{—}O\text{—}$, wherein X is selected from the class consisting of hydrogen and fluorine, with said hydrogen being bonded to other than the oxygen bonded carbon atom, and $R_f$ is a divalent perfluoroalkylene radical of up to 12 carbons; $a$ and $b$ are cardinal whole numbers of 1–3, $c$ is a cardinal whole number of 0–2 and $d$ is a cardinal whole number of 0–3.

2. 1,3-bis(3'-trifluoromethoxyphenoxy)benzene.
3. 1,3-bis[3'-(4" - trifluoromethoxyphenoxy)phenoxy] benzene.
4. 1,3-bis(3'-pentafluoroethoxyphenoxy)benzene.
5. 4,4'-bis(trifluoromethoxy)diphenyl ether.
6. 4,4'-bis(2H-tetrafluoroethoxy)diphenyl ether.

References Cited by the Examiner

UNITED STATES PATENTS

| | | | |
|---|---|---|---|
| 2,668,182 | 2/1954 | Miller | 260—614 X |
| 3,129,250 | 4/1964 | Lawlor et al. | 260—614 X |

FOREIGN PATENTS

| | | |
|---|---|---|
| 1,238,643 | 7/1960 | France. |
| 1,242,463 | 8/1960 | France. |
| 695,146 | 8/1953 | Great Britain. |

OTHER REFERENCES

Blake et al., WADC Technical Report 57–437, ASTIA Document No. AD 142,188, Dec. 1957, 57 pages; pages 1, 4, 7–15, 17, 18 and 24–29 are relied on.

Chemical and Engineering News, vol. 37, No. 5 (1959) pp. 64–65.

FOREIGN PATENTS 765,257   1/1957   Great Britain.

OTHER REFERENCES

Chem. Abstracts, 50, 11270 (1956).
Chem. Abstracts, 51, 15517 (1957).
England et al., J. Am. Chem. Soc., 82, 5116 (1960).
Lovelace, Rausch & Postelnak, "Aliphatic Fluorine Compounds," pp. 164–177, Reinhold (1958).

LEON ZITVER, *Primary Examiner.*

CHARLES B. PARKER, H. G. MOORE, *Examiners.*

B. HELFIN, *Assistant Examiner.*